Aug. 4, 1964

M. J. DIJKMANS ETAL 3,143,306

PANEL MAKING APPARATUS

Filed Aug. 12, 1960

INVENTORS
Maximilian J. Dijkmans
BY  Raymond S. Beiner
Leroy Magers, Jr.

Curtis, Morris & Safford
ATTORNEYS

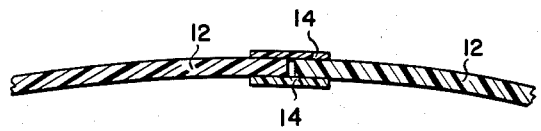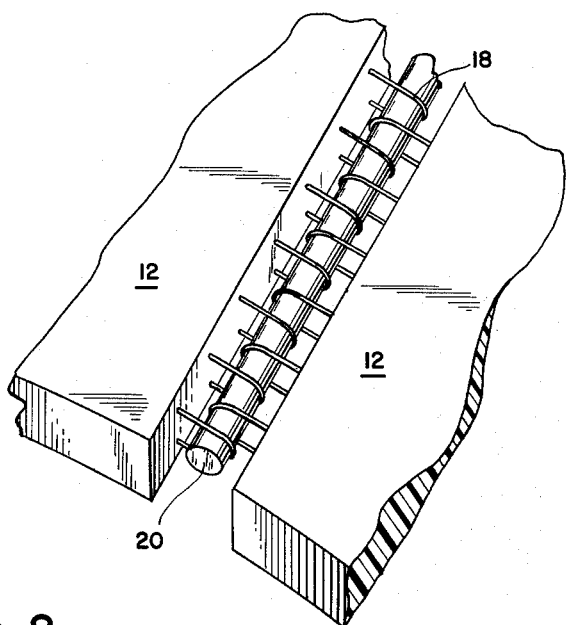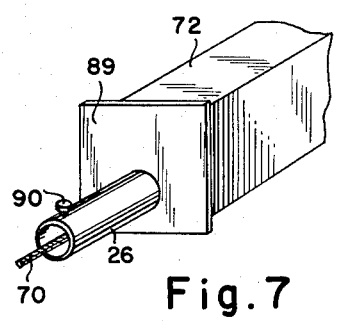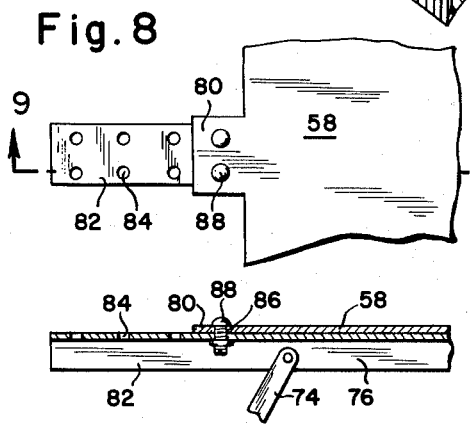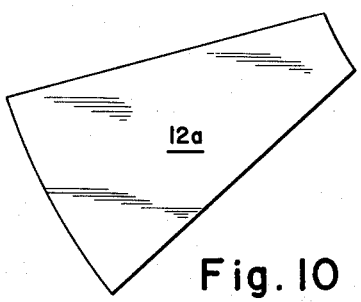

Aug. 4, 1964  M. J. DIJKMANS ETAL  3,143,306
PANEL MAKING APPARATUS
Filed Aug. 12, 1960  3 Sheets-Sheet 3
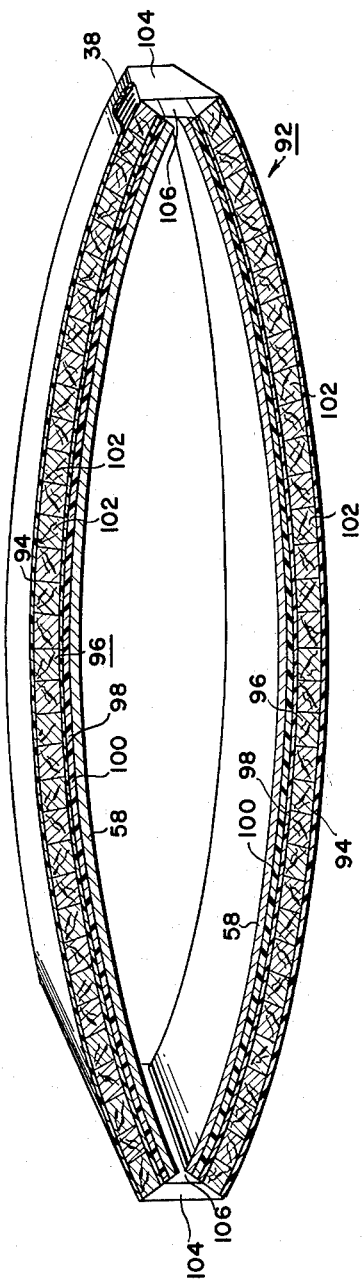
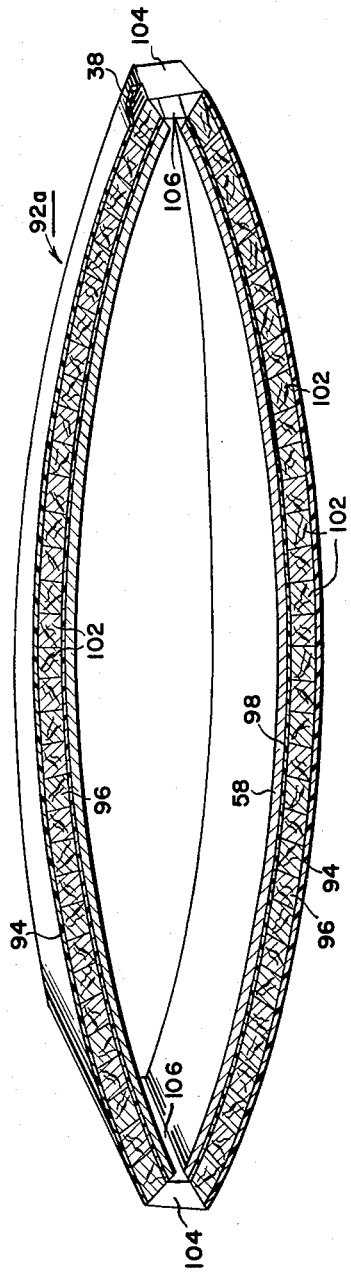
INVENTORS
Maximilian J. Dijkmans
BY Raymond S. Beiner
Leroy Magers, Jr.
Curtis, Morris & Safford
ATTORNEYS United States Patent Office 3,143,306
Patented Aug. 4, 1964

3,143,306
PANEL MAKING APPARATUS
Maximilian J. Dijkmans, New York, N.Y., and Leroy Magers, Jr., and Raymond S. Beiner, Hillside, N.J., assignors to Preload Corporation, New York, N.Y., a corporation of Delaware
Filed Aug. 12, 1960, Ser. No. 49,381
5 Claims. (Cl. 242—7)

This invention relates to liquid storage tanks; and, more particularly, to generally circular tanks made primarily of modular reinforced plastic panels, and a method and apparatus for making such panels.

This application is a continuation in part of our copending application, Serial No. 2,773, filed January 15, 1960.

Prior to the present invention it has been the general practice to construct tanks, particularly those of large diameter, of steel, reinforced concrete, or reinforced prestressed concrete. For the storage of highly corrosive liquids stainless steel, monel, or other highly expensive metals are sometimes used.

Steel tanks while having high strength are not suitable for use with many materials which react with that metal. Nor are they suited for use in the storage of water and other liquids unless special protective coating measures are taken. In addition, steel tanks are very costly to prefabricate and require special structural precautions to prevent joint leakage. Also, steel tanks are greatly affected by changes in temperature and special consideration must be made for the expansion and contraction of the steel.

Prestressed concrete tanks are more suitable than steel tanks for the storage of water and other liquids in that they are less expensive to maintain. However, prestressed concrete tanks are becoming more costly to erect due to continuous rise in the cost of materials used and the labor employed in their construction.

In order to overcome the shortcomings of the prior art tanks, tanks made in accordance with the present invention are primarily made of a thermosetting plastic which is internally reinforced with suitable filament materials such as fine steel wire. Tanks manufactured of such reinforced plastic material are not only corrosion resistant but in many respects structurally stronger than tanks of other materials. Reinforced plastic tanks generally have a higher tensile strength than concrete tanks and therefore require less external reinforcement.

Another advantage of reinforced plastic tanks is the ease of repair. A reinforced concrete tank or a prestressed reinforced concrete tank which develops a leak or seepage due to cracking etc. presents a difficult and expensive repair problem. Reinforced plastic tanks are fairly easily repaired by use of compatible plastic patching materials. Such patching materials quickly bond to the plastic of the tank structure without the necessity of extensive preparations such as cutting out the cracked portion of the concrete.

Field construction of reinforced concrete tanks (including prestressed tanks) presents many difficulties not the least of which is field quality control of the concrete in batching, mixing and placing. With modular reinforced plastic tank construction such control is greatly eliminated as the panels may be prefabricated under shop conditions where quality control is more feasible.

In constructing tanks in accordance with the present invention, pre-formed modular panels are advantageously used to construct the tank wall and external reinforcing is added as required.

Preliminary to constructing the tank wall, a suitable foundation is prepared. The foundation may be of any desired type so long as it accommodates the particular modular panel selected and has sufficient strength to withstand the load of the stored liquid. With the foundation prepared a ring of panels is assembled. The panels are advantageously of the interlocking type (e.g. laced joints or tongue and groove joints), or in an alternate form the panels are supported on a suitable grid framework.

With the panels in place the interlocked vertical joints are sealed with suitable coverings which further act as vertical reinforcements.

In one procedure, after the panels are secured in place the formed tank is then reinforced with a selected wrapping which is under a light tension sufficient to hold the loops of wrapping securely in place. When the tank is loaded the filament reinforced plastic panels carries a portion of the developed stress while the remainder is transferred to the loops of wrapping which reinforce the tank.

In one aspect of the present invention substantial economy of manufacturing the filament reinforced panels is achieved by means of adjustable panel forming apparatus. Tanks are constructed in various diameters and, accordingly, the panel members of each diameter tank has a particular radius of curvature. If one tank is constructed with a diameter of fifty feet and a second tank with a diameter of seventy-five feet, the panels for each will not have the same radius of curvature. This requires that separate molds or pans be used to manufacture the panels for each tank.

In order to eliminate the expense of providing a set of molds for each radius of curvature, adjustable forming apparatus in accordance with the present invention is provided. This aparatus permits the curvature of the mold to be readily adjusted to give the particular curvature required for panels of each diameter tank.

This apparatus results in not only eliminating a large investment in various size molds, but also reduces the storage space needed, the necessity of changing of molds for each tank, and other labor and time savings.

Accordingly, it is an object of the present invention to provide an apparatus for manufacturing reinforced plastic tank panels. It is another object of the present invention to provide apparatus for making modular panels for tanks which are low in cost in comparison with steel and concrete tanks. It is still another object of the present invention to provide apparatus which is adjustable for making filament reinforced panels of various curvatures to permit construction of tanks of various diameters.

In the drawings:

FIGURE 5 is a partially fragmentary sectional view showing a lap type joint for joining adjacent panels together;

FIGURE 6 is an enlarged and partially fragmentary perspective view showing loop connections as one method of joining adjacent panels together;

FIGURE 7 is an enlarged and partially fragmentary perspective view of a connection between the beam for the mandrel and the shaft for mounting the mandrel on the support frame;

FIGURE 8 is an enlarged and partially fragmentary plan view of a locking device for holding the central supports for the mandrel sheets in place;

FIGURE 9 is a sectional view along the lines 9—9 of FIGURE 8;

FIGURE 10 is a plan view on a reduced scale showing a trapezoidal shaped mandrel sheet for making trapezoidal shaped panels;

FIGURE 11 is a sectional perspective view of a composite panel arranged on a mandrel sheet; and FIGURE 12 is a sectional perspective view of another composite panel arranged on a mandrel sheet.

Figure 1:
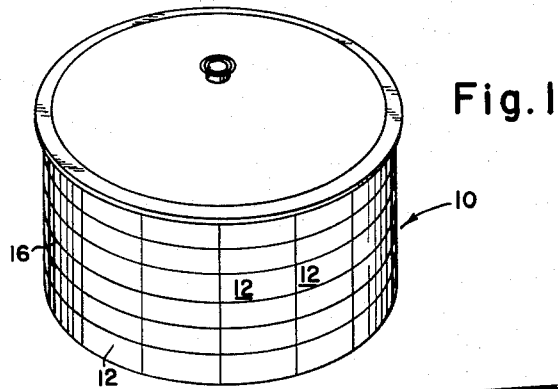
FIGURE 1 is a perspective view of a modular filament reinforced plastic panel tank in accordance with the present invention.

Referring to the drawings and to FIGURE 1 in particular, a tank 10 is assembled on a prepared foundation from a series of modular panel units 12 which are made of a filament reinforced plastic material. The panels 12 are of the pan type and, they are made of a suitable molded plastic and reinforced with a filament material such as fine steel wire, which is embedded into the plastic. A reinforced panel of this type has high strength and may be designed at least under the same allowable stresses as steel. However, such reinforced plastic panels have a much lower weight to strength ratio than steel plates and little or no maintenance compared to the high cost of properly maintained steel. Due to the light weight of the plastic panels the erection cost is also reduced.

The plastic used in the reinforced panels 12 may be made of any suitable plastic material such as polyesters, epoxies, or acrylics. If desired short lengths of fiber glass, about one to two inches long, may be mixed with the plastic for further reinforcement, in addition to the filament which is wound into the plastic as will be described hereinafter in greater detail.

The panels 12 are joined together by a suitable vertical joint connection, such as the lap joint shown in FIGURE 5 or the loop joint of FIGURE 6. In the construction shown in FIGURE 5 sealing strips 14 are vertically arranged along the inner and outer surfaces of each joint. The outer strips 14 also act to provide a support or wearing edge for an external reinforcing wrapping 16 which is provided around the outer perimeter of the tank 10. If desired, the strips 14 may be built up to function also as vertical reinforcing ribs.

In the construction shown in FIGURE 6 the joints are formed by securing a series of loops 18 together by means of a rod 20. If desired, the loops 18 may be laced together and the rod 20 eliminated. After the loops are connected, the joint is then finished by applying a compatible plastic filler in and over the joint so that a tight seal is acquired.

Wrappings 16 are applied about the outer surface of the tank 10 as required in order to reinforce it properly. In one embodiment, wrappings 16 are made of a relatively non-extensible material. By a non-extensible wrapping material is meant a material having a modulus of elasticity or Young's modulus equal to or greater than the Young's modulus of the composite reinforced plastic of the panels. For example, a steel cable with a Young's modulus of $29 \times 10^6$ p.s.i. would be greater than the modulus of an internally reinforced plastic panel which may be as low as $1.5 \times 10^6$ p.s.i. Also, an asbestos reinforced plastic tape which may also be used, may have a modulus as high as $10 \times 10^6$ p.s.i. or as low as $2.5 \times 10^6$. Accordingly, such a low value tape would be considered a non-extensible wrapping for a tank wall having modular panels with a modulus of $1.5 \times 10^6$, but not for composite panels having a modulus of $3.0 \times 10^6$.

The wrappings 16 may be applied to the tank in either a hoop or a spiral arrangement as desired. The various rows of wrappings are maintained under a tension sufficient to hold them in place and to insure proper spacing.

Before the panels 12 are assembled to form a tank, a foundation must be prepared. This foundation may be of any suitable type. One type of foundation is formed by compacting the sub-grade to a desired density and then providing a reinforced concrete footing and floor slab. In another arrangement the floor slab may be of any suitable reinforced plastic.

Figure 2:
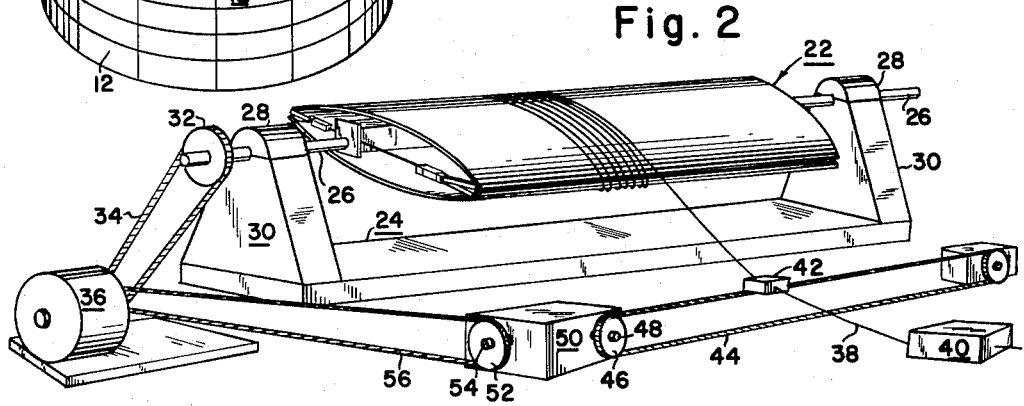
FIGURE 2 is a perspective view of filament winding apparatus for preparing modular panels for use in constructing the tank of FIGURE 1.
Figure 3:
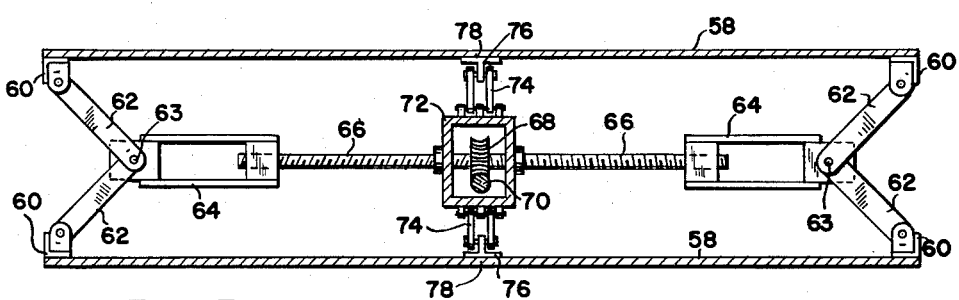
FIGURE 3 is a sectional view through the mandrel of the apparatus showing the means for adjusting radius of curvature of the modular panels.
Figure 4:
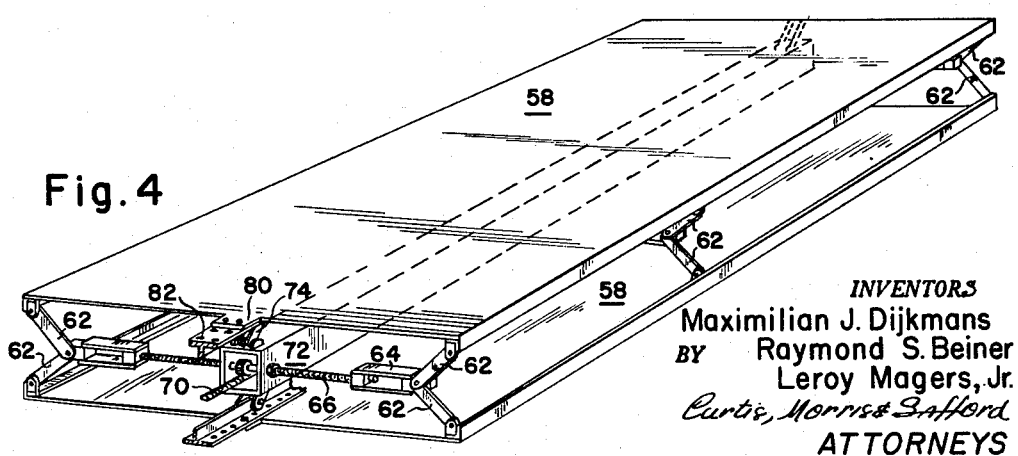
FIGURE 4 is a perspective view of the mandrel.

Apparatus for manufacturing the filament reinforced modular panels 12 is shown in FIGURES 2, 3, and 4. This apparatus generally comprises a mandrel 22 having a flexible surface and supported on a base frame 24. Means is also provided for rotating or reciprocating the mandrel while winding a filament such as fine steel wire about the mandrel.

The mandrel 22 is mounted on a stub shaft 26 which is set in split bearing blocks 28. The bearing blocks 28 are mounted on supporting heads 30 which are part of the frame 24. A sprocket 32 is fitted on one end of a stub shaft 26 and this sprocket is driven by a chain 34 which in turn is driven by a motor 36.

If desired a reciprocating gear box of any known type may be inserted between the motor 36 and the chain 34 so that the mandrel will not be rotated but instead will be reciprocated. This type of reciprocating action may be desirable when a panel is desired having loops for joint connections such as shown in FIGURE 6.

A filament reinforcement 38 is applied to the mandrel 22 by the rotation or reciprocation of the driven mandrel. The filament 38 is fed from a source of supply through a bath 40 which contains a suitable resin. From the bath 40 the filament 38 is passed through a guide 42 and then on to the mandrel 22. If desired, the bath 40 and the guide 42 may be combined into one unit.

The guide 42 is mounted on a driven chain 44 which is connected to a sprocket gear 46. This gear 46 is driven by the output shaft 48 of a variable speed and reversing apparatus 50. A sprocket gear 52 is mounted on the input shaft 54 of the apparatus 50, and this gear 52 is connected by a driven chain 56 to the motor 36. By connecting the chains 34 and 56 to the same power source related and timed motion between the movement of the mandrel 22 and the placement of the filament 38 is obtained.

The mandrel 22 has a pair of flexible outer sheets 58 which may be curved to whatever radius is desired. The desired curvature is obtained by drawing the adjacent longitudinal sides or edge surfaces of each sheet 58 together while maintaining a supported condition at the center of the sheets and if necessary at intermediate points between the center and the side edges. Thus the end edge surfaces or transverse sides, i.e., the sides of sheets 58 lying in a plane perpendicular to the axis of the mandrel, are curved in the manner shown in FIG. 2.

Mounted along the outer side edge or longitudinal side of each sheet 58 is a supporting angle 60. Attached to these angles 60 are a series of toggle levers 62. Each pair of toggle levers 62 is pivotally attached at a knee joint 63 to threaded socket members 64. Threaded into each socket member is one end of a shaft 66. A right hand thread is on one end of the shaft 66 while a left hand thread is on the other. By this means a rotation of the shaft 66 will result in the same movement with respect to each hand socket member 64, i.e., an inward movement of the left hand socket member 64 (shown in FIGURE 3) caused by a rotation of the shaft 66, will be accompanied by a simultaneous inward movement of the right hand socket member 64.

Centrally mounted on the shaft 66 is a worm gear 68 which is matingly driven by a shaft 70. By driving the shaft 70 the toggle levers 62 may be activated and the position of the side edges of the sheets 58 determined.

In most mandrel forms it will be preferable to use a series of toggle arrangements. Accordingly, a central support beam 72 is provided. The support beam 72 is a hollow member which serves as a frame for a series of worm gears 68.

Also mounted on the support beam 72 are a series of pivoted links 74. These links 74 are pivoted to the support beam 72 and also to T-bars 76 which are adjacent to the inner surfaces of the sheets 58. By slidably moving the T-bars parallel to the beam 72, the links 74 rock the T-bars away from or towards the beam and, thus, cause the central portions 78 of opposing sheets 58 to change position with respect to each other. This permits a still greater control of the curvature of the sheets 58.

To hold the T-bar 76 in place during a filament winding operation, a clamping device is provided. This clamping device is shown in FIGURES 8 and 9 and comprises a tab 80 which extends from the end of the sheets 58 adjacent to the T-bar 76 and cooperates with an extension 82 of the T-bar 76. A series of holes 84 are provided in the extension 82 and these mate with holes 86 in the tab 80. To lock the T-bar 76 in place a bolt 88 is fitted through the holes 86 and the selected holes 84 in the extension 82. By providing a series of holes 84 the T-bar may be adjusted into several positions.

As shown in FIGURE 7, the support beam 72 is attached to the shaft 26 by means of an attaching plate 88. Plate 88 is attached to the beam 72 by welding or other suitable means. An opening in the plate 88 corresponds to the central opening of the shaft 26. This permits the worm gear shaft 70 to protrude through the shaft 26 and be adjusted as required to properly set the toggle levers 62. A set screw 90 in shaft 26 locks the shaft 70 in place.

If the lateral span of the mandrel is large it may be desirable to include one or more intermediate supports for the sheets 58 between the side edges and the central beam 72. The operation of these intermediate supports will be similar to that of the central support system.

It is to be understood that panels may be of any desired configuration in accordance with the present invention. Accordingly in FIGURE 10, a panel of trapezoidal outline is shown. The shape of the panel will be dependent on the design of the sheets 58 and the curvature imparted thereto. The selection of the shape and curvature is well within the knowledge of those skilled in the art.

To prepare a panel using the above described apparatus, the curvature of the sheets 58 is first determined and positively set. A suitable release agent is then applied to the outer surface of the sheets, if one is required. Next, a thin coat of the plastic material is applied. The plastic may be of any desired type such as epoxy and reinforced with fiber glass. The filament is then wound about the mandrel in the desired manner until the amount required is applied. After the filament is wound onto the mandrel a final or finish plastic coating is next applied. If required the plastic coats may be rolled for smoothing and avoiding roughing.

When the plastic is sufficiently set the mandrel may be removed or, if desired, the formed panels may be cut away by severing the filament between the adjacent edges of the panels formed on each sheet 58.

From the foregoing it will be seen that the present apparatus permits two panels to be made simultaneously.

In some cases it will be desirable to have a panel which is built up out of several different materials. This is applicable to situations where the height or length of the panels is rather large and added stiffness is desired. A composite panel also offers the advantage of permitting inexpensive materials such as wood to be used as a filler within a sandwich of outer layers of filament reinforced plastics.

In FIGURES 11 and 12, embodiments of composite panels are shown arranged on the sheets of a mandrel. In FIGURE 11 the composite panel 92 on a mandrel sheet 58, is comprised of an outer layer of filament wound reinforced plastic 94, a major filler layer of wood 96, an inner layer of filament wound reinforced plastic 98, and a protective inner lining sheet 100 made of some selected plastic such as polyvinyl chloride.

The composite panel 92a in FIGURE 12, is similar to that of FIGURE 11, except that the lining sheet 100 is not included.

To make the panel 92, the mandrel sheets 58 are first shaped to the desired radius of curvature. The lining sheet 100 is laid in place on the sheet 58 and temporarily adhered or tacked thereto until the composite is completed. An inner layer 98 of filament wound reinforced plastic, such as an epoxy wound with fine filament wires, is then applied as described herein before. The wood layer 96 is then set in place. In the illustrated embodiment, the wood filler is made up of a series of wood strips 102 which are joined together by any suitable means such as wood staples, adhesives, etc., and the formed layer 96 shaped to the curvature of the mandrel sheet 58. If necessary the wood layer 96 is held in place by any suitable means until the outer layer 94 is applied.

The outer layer 94 is of similar composition and construction as the inner layer 98, and it is applied in a similar manner.

The wood layer 96 may be treated to prevent it from absorbing the plastic of the layers 94 and 98; or if it is desired the wood may be left untreated so that it will absorb some of the plastic, and thus, develop a bond between the wood and the plastic layer.

A composite panel, such as 92 and 92a, permits less plastic to be used and still achieve a structure which is strong and rigid, yet economical.

To join the composite panels together any suitable means may be used. If desired, the flaps formed when the two panels are removed from the mandrel may be utilized. These flaps 104 and 106 may be lapped over the next panel when forming the structure and used as a sealing strip.

If loops are to be applied to form a panel connection as shown in FIGURE 6, two sets of apparatus may be used and one positioned on each side of the mandrel so that two panels still can be formed.

It is to be understood that the present invention is not to be limited to the illustrated embodiment disclosed herein but to such other embodiments as may be made in accordance with the following claims.

We claim:

1. Apparatus for making modular filament wound reinforced plastic panels of various radii of curvature, said apparatus comprising a support frame, a driven shaft supported on said frame, a flexible surface mandrel having longitudinal and transverse sides, said mandrel being mounted on the shaft, said longitudinal sides being substantially parallel to the shaft and said transverse sides lying in a plane substantially perpendicular to the shaft, adjustable position means within the mandrel for curving the flexible surface of the mandrel to a selected radius of curvature about the axis of the shaft whereby said surface mandrel is curved in the plane of the transverse sides, said adjustable means connected to the flexible surface of the mandrel at the longitudinal sides of the mandrel and means for rotating said shaft whereby filament may be placed on said mandrel by said rotation.

2. Apparatus as defined in claim 1 wherein said apparatus further includes a guide for directing the position of a filament about the mandrel.

3. Apparatus as defined in claim 1 wherein the adjustable position means includes an expandable and contractable mechanism whereby a predetermined curvature of surface may be obtained.

4. Apparatus as defined in claim 3 wherein the expandable and contractable mechanism includes a central support and toggle levers, said toggle levers connected to the outer longitudinal portions of the flexible surface of the mandrel, said central support between the toggles whereby the outer portions of the flexible surface of the mandrel may be deflected in relation to that portion of the flexible surface sustained by the central support so that said flexible surface may be curved to a selected radius of curvature.

5. Apparatus for making modular filament wound reinforced plastic panels of various radii of curvature for large capacity storage tanks and the like, said apparatus comprising a support frame, bearing blocks mounted on the support frame, a rotatable shaft, a flexible and adjustable surfaced mandrel mounted on the rotatable shaft, said shaft being set in the bearing blocks, a filament guide, a driving motor connected to said shaft and to the filament guide, a supply of filament in contact with said guide whereby said filament may be pulled through said guide and wrapped about the mandrel by the rotation of said shaft and movement of said guide, said mandrel having mounted therein surface adjusting means comprising a central support extending longitudinally through said mandrel and having mounted thereon and connected to the surface of the mandrel expandable and contractable mechanism for positioning the mandrel surface adjacent to the central support relative to said support, other expandable and contractable mechanisms spaced laterally from said central support and connected to the mandrel surface for positioning the mandrel surface adjacent to said other mechanisms whereby the mandrel surface may be positively set in a desired curvature.

References Cited in the file of this patent

UNITED STATES PATENTS

| | | |
|---|---|---|
| 1,246,130 | Macready | Nov. 13, 1917 |
| 1,497,142 | Hart | June 10, 1924 |
| 1,846,767 | Steuer et al. | Feb. 23, 1932 |
| 2,074,592 | Rowell | Mar. 23, 1937 |
| 2,785,866 | Vogt | Mar. 19, 1957 |
| 2,936,129 | Bram | May 10, 1960 |